United States Patent [19]
Lin

[11] Patent Number: 5,574,675
[45] Date of Patent: Nov. 12, 1996

[54] STATE-CONTROLLED HALF-PARALLEL ARRAY WALSH TRANSFORM

[75] Inventor: Wen-Chang Lin, Hsinchu, Taiwan

[73] Assignee: Industrial Technology Research Laboratories, Hsinchu, Taiwan

[21] Appl. No.: 215,857

[22] Filed: Mar. 22, 1994

[51] Int. Cl.⁶ ......................................... G06F 7/36
[52] U.S. Cl. ............................................. 364/727
[58] Field of Search .................. 364/725, 727, 364/826; 382/281

[56] References Cited

U.S. PATENT DOCUMENTS

| | | | |
|---|---|---|---|
| 4,839,844 | 6/1989 | Watari | 364/727 |
| 5,008,848 | 4/1991 | Akiwumi-Assani | 364/727 |
| 5,357,454 | 10/1994 | Dent | 364/727 |

OTHER PUBLICATIONS

Wishner, H. D., "Designing A Special Purpose Digital Image Processor", Computer Design, vol. 11, pp. 71–76, Feb. 1972.

Geadah, Y. A., and M. J. G. Corinthios, "Natural, Dyadic And Sequency Order Algorithms And Processors For The Walsh–Hadamard Transform", IEEE Trans. Computer C–26, No. 5, pp. 435–442, May, 1977.

Chung–Kwong Yuen, "Remarks On The Ordering Of Walsh Function", IEEE Trans. Computer C–21, p. 1452, Dec. 1972.

Carl N. Smartwood, "A Hybrid Walsh Transform Computer", IEEE Trans. On Computer C–22, No. 7, Jul. 1973, pp. 669–672.

Harmuth, H. F., "Transmission Of Information By Orthogonal Functions", Cpt. 4, New York, Springer, 1969.

Primary Examiner—Tan V. Mai
Attorney, Agent, or Firm—Meltzer, Lippe, Goldstein, et al.

[57] ABSTRACT

A Fast Walsh Transform (FWT) processor is disclosed, based on Good's factorization, which reduces the number of adder/subtractor units to (N/2), where N is the dimension of the FWT. The process time is equal to 2p clock cycles, where p=the 2's power of N. The clock period is determined by the delay times of the processor's internal devices (multiplexers, adder/subtractors, flip-flops), and can be minimized by using high speed complementary metal oxide semi-conductor (CMOS), or equivalent. The improvements in speed, and simplicity of implementation disclosed herein, offer performance and cost benefits in the field of digital cordless telephone technology.

7 Claims, 4 Drawing Sheets

STATE-CONTROLLED HALF-PARALLEL ARRAY WALSH TRANSFORM

FIELD OF THE INVENTION

The disclosed invention comprises a special purpose processor circuit and algorithm for the rapid computation of a Fast Walsh Transform.

BACKGROUND OF THE INVENTION

The Fast Walsh Transform (FWT), or Hadamard transform, has been applied to the fields of signal processing, pattern recognition, and communication theory ("Proc. Symp. Appl. Walsh Functions", Naval Res. Lab., Wash., D.C., 1970; "Proc. Symp. Appl. Walsh Functions", Naval Res. Lab., Wash. D.C., 1971; "Sequency filters based on Walsh functions for signals with two space variables", in Proc. 4th Hawaii Int. Conf. Syst. Sci., Univ. Hawaii, Honolulu, pp 414–416, 1971). The following U.S. Pat. Nos. also relate to Walsh Transforms.

| | | |
|---|---|---|
| 3,879,605 | Special purpose hybrid computer to implement Kronecker matrix transform | Carl, Joseph W.; Swartwood, Richard V |
| 3,956,619 | Pipeline Walsh-Hadamard transform | Mundy, Joseph L.; Joynson, Reuben E. |
| 4,357,677 | Hadamard converter employing charge transfer devices | Rebourg, Jean-Claud |
| 4,389,673 | Hadamard transformer using charge transfer devices | Despois, Claude; Rebourg, Jean-Claude |
| 4,446,530 | Fast Hadamard transform device | Tsuboka, Eiichi |
| 4,525,798 | Apparatus for performing a Hadamard transform | Rebourg, Jean-Claude Despois, Claude |

Due to its orthogonality property, the Walsh transform is well suited for code division multiple access (CDMA) applications, such as cordless phone systems or wireless mobile communications.

The FWT can be used for frequency estimation in lieu of the traditional Fast Fourier Transform (FFT) (See, e.g. U.S. Pat. application Ser. No 08/477,863, entitled Estimation of Frequency in Digital Signals Using Fast Walsh Transform, filed on Jun. 7, 1995, which is a divisional of application Ser. No. 08/209,962 filed on Mar. 14, 1994 now abandoned for Chun-Chian Lu and assigned to the assignee hereof).

The FWT process can offer greater speed and simpler hardware implementation than the FFT techniques (see, e.g., Harmuth, H. F., "Transmission of Information by Orthogonal Functions", New York, Springer, 1969; "Survey of analog sequency filters based on Walsh functions", in Proc. Symp. Appl. Walsh Functions, Naval Res. Lab., Wash., D.C., pp 208–219, 1970; Wishner, H. D., "Designing a special purpose digital image processor", Computer Design, vol. 11, pp 71–76, February 1972).

Many of the prior FWT implementations were based on Good's factorization of the Hadamard matrix (Good, I. J., "The interaction algorithm and practical Fourier analysis", J. Roy. Statist. Soc., London, vol. B20, 1958).

Good's factorization reduced the required number of additions and subtractions from N(N–) to Nlog2 N, but still involved complex signal flow patterns (Yuen, C. K., "Remarks on the ordering of Walsh function", IEEE Trans. Computer C-21, 1452, 1972). Other variations on Good's matrix offered simplified computation (Geadah, Y. A., and M. J. G. Corinthios, "Natural, dyadic and sequency order algorithms and processors for the Walsh-Hadamard transform", IEEE Trans. Computer C-26, 435–442, 1977), reduction of interconnection lines (Joseph, W. C., and V. S. Richard, "A hybrid Walsh transform computer", IEEE Trans. on Computer C-22, July 1973), parallel implementation (Elliot, A. R., and Y. Y. Shum, "A parallel array hardware implementation of the fast Hadamard and Walsh transforms", Proc. Symp. Appl. Walsh Functions, Wash. D.C., pp 181–183, 1972), serial implementation (Muniappan, K., and R. Kitai, "Walsh spectrum measurement in natural, dyadic, and sequency ordering", IEEE Trans. Electromag. Compat. EMC-24, 46–49, 1982), and perfect shuffle and the combined adder/subtractor (Shirata K., and M. Nakatsuyama, "The fast Walsh-Hadamard transform and processors by using new permutation networks", Trans. IECE Jpn. J63-D, 319–325, 1980, and also Nakatsuyama, M., and N. Nishizuka, "The fast Walsh-Hadamard transform and processors by using delay lines", Trans. IECE Jpn. E64, 708–715, 1981). Still other methods have used microprocessor, ROM, RAM, PLA, CCD, or SAN devices to perform the Walsh-Hadamard process.

All of the aforementioned techniques have had some limiting disadvantage, either in speed, or hardware complexity, or specific device implementation. For example, the prior method of parallel implementation used N (dimension of the FWT) adder and subtractor units, and the interconnections between the multiplexer and adder were very complex. The prior serial method used fewer adder and subtractor units, but required increased computation time. The perfect shuffle and adder/subtractor (A/S) techniques reduced the number of A/S units from pN to pN/2, where p is the 2's power of N. But, the controller circuit was very complicated, and the output speed was limited to one point at a time.

In view of the foregoing, it is an object of the invention to provide an FWT processor which reduces the number of A/S units from the prior art (pN/2) to (N/2). It is a further object of the invention to reduce the processing time of the FWT computation to 2p clock cycles. It is another object of the invention to provide an FWT processor circuit which can be made up of any type of logic device. It is also an object of the invention to configure an FWT processor with simplified control and interconnection lines, as compared to the prior art.

SUMMARY OF THE INVENTION

The present invention is a Fast Walsh Transform processor circuit, using combined adder/subtractor units to perform (p) successive matrix multiplications on each element in a received signal vector (X1,X2... XN), where N=2p, and p is a positive integer. This matrix multiplication is achieved with only (N/2) A/S units, due to the recursive pattern of the inventive algorithm. The add or subtract function of each A/S unit is selected during the process in order to reproduce the signal flow pattern of Good's factorization for an FWT. The total number of iterations is equal to 2p, and the total processing time required for a complete set of N output vector elements is 2p clock cycles.

As an illustrative example, an 8th order FWT processor is described, with N=8, p=3, and 2p=6, as summarized below:

The input signal vector (X1,X2... X8) is divided into four pairs of signals by eight input signal multiplexers. These four signal pairs are then connected to the inputs of the four A/S units, such that each (A/S) unit receives two components of the input vector (e.g., X1 and X2). The A/S units are configured for a first iteration to add their respective pairs of inputs, and then output these summed signals to respective one's of four flip-flop circuits.

In the second iteration (as controlled by the 6-step system clock), the flip-flop outputs are split into two lines each, and re-connected to the inputs of the A/S units, such that there are again two inputs to each A/S unit. The four A/S units are reconfigured as required by Good's factorization (+, −, +, −, where "+" indicates a unit performs addition and "-" indicates a unit performs subtraction) and their respective outputs are again stored in the flip-flops.

In the third iteration, two additional multiplexers are used to redirect the outputs of two of the four flip-flops, in accordance with the signal flow pattern of Good's factorization. As in the second iteration, the flip-flop outputs are split into two lines each, and re-inputted to the A/S units, which remain in the same configuration (+, −, +, −). The A/S outputs are again stored in their respective flip-flops, and become the first set of output vector elements (Y1, Y3, Y5, Y7).

The fourth, fifth, and sixth iterations follow the same procedure as the first, second, and third, except that the A/S units are configured differently (−, −, −, − for the fourth iteration, and +, −, +, −for the fifth and sixth iterations). At the end of the sixth iteration, the second set of output vector elements is obtained (Y2, Y4, Y6, Y8).

The disclosed FWT processor utilizes a recursive algorithm, based on Good's factorization technique. This algorithm makes significant reductions possible in adder/subtractor circuits, and also allows for a simplified interconnection circuit between the various processor elements. Processing time is thereby reduced, and is limited only by the speed of the processor clock and the inherent time delays of the processor's circuit elements. While the inventive processor may contain any kind of logic device, the preferred embodiment described herein uses state machine logic for simplicity of implementation, and a signal vector of N=8, corresponding to p=3 matrix multiplications, and 2p=6 iteration cycles.

The increased speed and simplified implementation of the present invention can improve performance and reduce costs of CDMA technology, such as used in digital cordless telephone systems and wireless mobile communications.

DETAILED DESCRIPTION OF THE INVENTION

The inventive algorithm and processor circuit are designed to implement a Fast Walsh Transform (FWT) on a signal vector X of rank N (X1,X2,X3...XN), where $N=2a$, with p being a positive integer. Let vector Y (Y1,Y2,Y3...YN) denote the FWT of vector X. Then, $$Y = HX \quad \text{(Equation 1)}$$

where H represents the Walsh-Hadamard matrix of order N. In the illustrative embodiment of the disclosed invention, an 8th order vector is used (X1,X2,X3,X4,X5,X6,X7,X8), but the inventive method may also be applied to higher order vectors.

For an 8th order FWT of input signal vector X, the form of matrix multiplication to produce an output vector Y is:

$$Y_8 = H_8 X_8 = \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} X_8 \quad \text{(Equation 2)}$$

The desclosed invention is based on Good's factorization of the FTW, which takes the following form in the 8th order, $$H_8 = \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} = \quad \text{(Equation 3)}$$

$$\begin{pmatrix} 1 & 1 & 0 & 0 & 0 & 0 & 0 & 0^3 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \end{pmatrix} = P_8^3$$

where the factored matrix $P_8$ must be raised to the third power.

The advantage of this factorization method is that the P8 matrix includes many zeros, thereby reducing the number of computations required.

From Equation 3, then, $$Y_8 = H_8 X_8 = P_8^3 X_8 = P_8(P_8(P_8 X_8)) \quad \text{(Equation 4)}$$

As indicated by Equation (4), the output Y requires three matrix multiplications of vector X by P. This process is illustrated by the signal flow diagram in FIG. 1, which depicts the three stages of multiplication. Stage 1 represents the matrix multiplication of P and X, stage 2 represents the matrix multiplication of P and PX, and stage 3 the matrix multiplication of P and P squared X, which results in the output vector Y.

Figure 2:
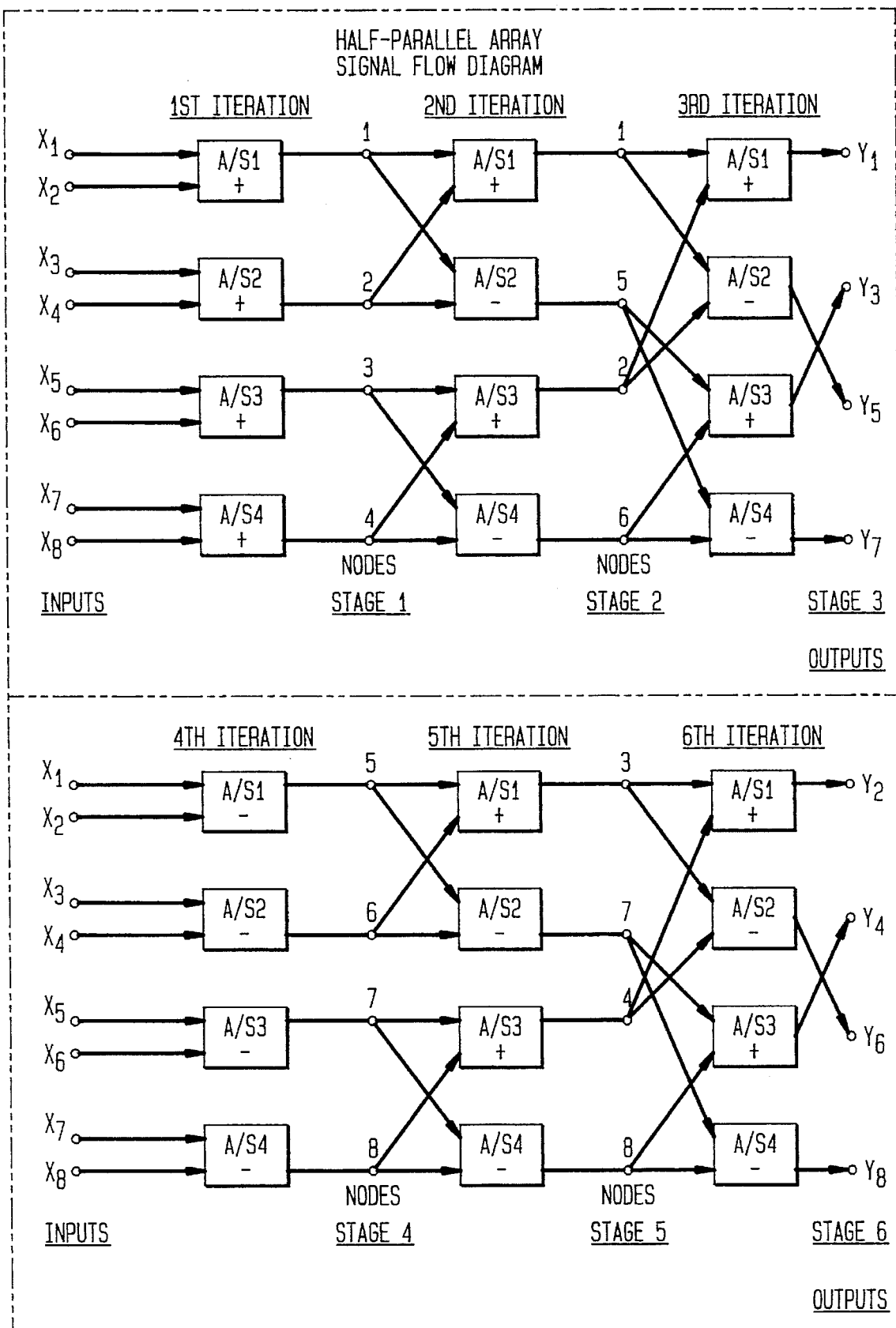
FIG. 2 pictorially represents the iteration steps and stage nodes of the inventive algorithm.

In FIG. 2, the inputs are X1, X2, ... X8 and the outputs are Y1, Y2, Y8. Each stage (Stage 1, Stage 2) comprises eight addition/subtraction nodes. A node with two solid line inputs is an addition node. A node with a solid line input and a dashed line input is a subtraction node.

Figure 1:
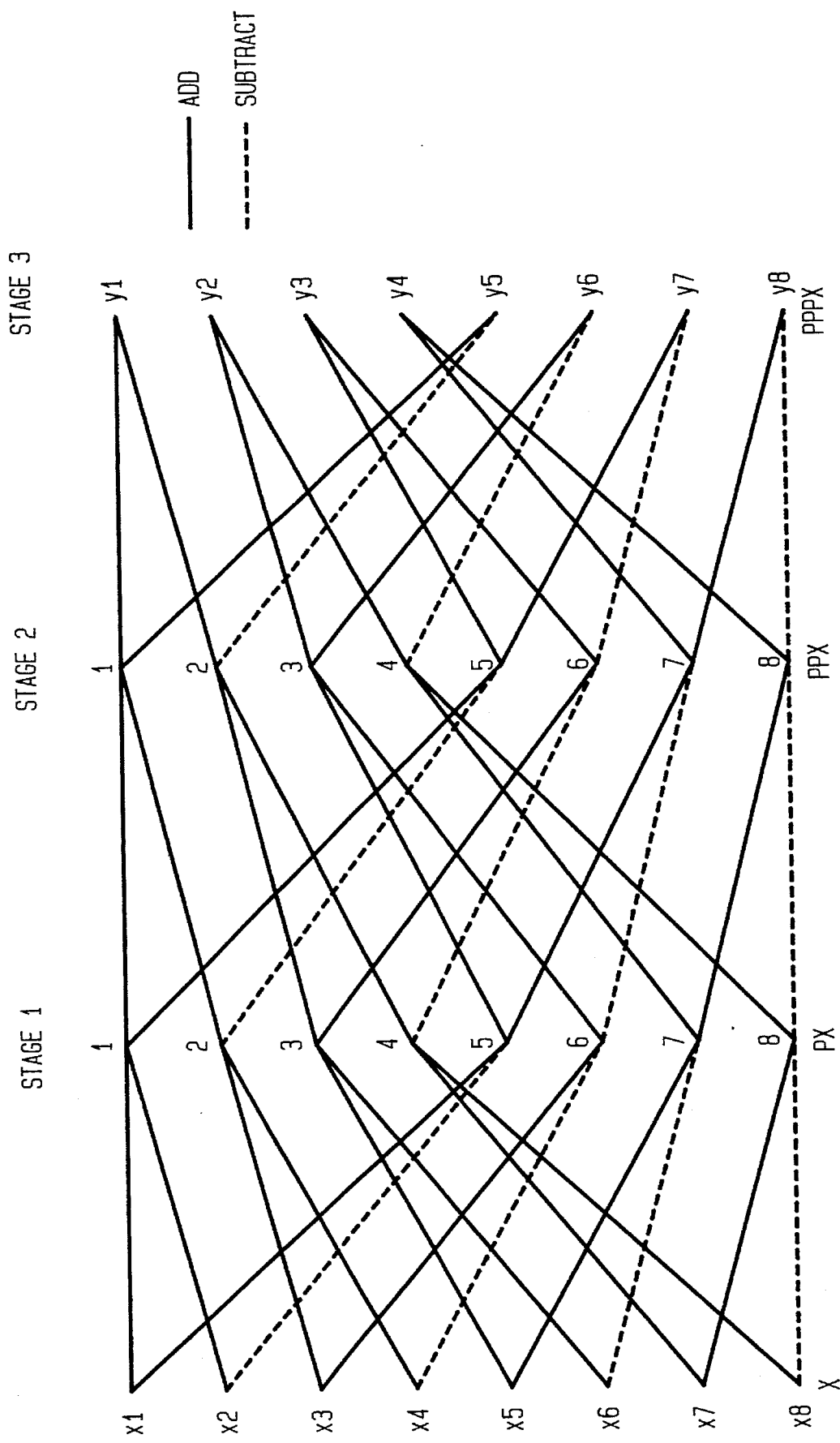
FIG. 1 diagrammatically illustrates the signal flow patterns of an 8th order Good's factorization.

Analysis of the flow diagram (FIG. 1) reveals that signal flow patterns in the three stages are completely identical. Further analysis of FIG. 1 shows that computations of the nodes 1 thru 4 of stage 1 and the 1st, 2nd, 5th, and 6th nodes of stage 2 result in odd-numbered elements of Y (Y1, Y3, Y5, Y7). Similarly, the nodes 5 thru 8 in stage 1 and the 3rd, 4th, 7th, and 8th nodes of stage 2 result in the even-numbered elements of Y (Y2, Y4, Y6, Y8). Therefore, by using re-configurable adder/subtractor (A/S) units, all of the Y output elements can be obtained with only four A/S units and six computational iterations. That is, the full-parallel form (N=8) of the 3-stage signal flow diagram of FIG. 1 may be re-configured to a half-parallel form (N/2=4) with a 6-stage computational signal flow. Thus, the number of A/S units can be reduced from N to N/2, simplifying the hardware implementation required for this process.

This inventive half-parallel array form of signal flow is depicted in FIG. 2, with an input signal vector (X) of rank N, where N=8, and with (N/2) A/S units (A/S 1, A/S 2, A/S 3, A/S 4).

The upper half of FIG. 2 shows the signal flow patterns of the first 3 iterations, culminating in 4 outputs (Y1, Y3, Y5, Y7), while the lower half of FIG. 2 shows the signal flows of the 4th, 5th, and 6th iterations, resulting in outputs Y2, Y4, Y6, and Y8. The same adder/subtractor units are used in each iteration, but their respective add or subtract function is set in accordance with the signal flow requirements of FIG. 1. For each A/S unit, the add or subtract function is identified by a + or − sign.

Referring to FIG. 2, it is seen that the first iteration requires the four pairs of input vectors (X1&X2, X3&X4, X5&X6, X7&X8) to be added, respectively, by the four A/S units. The four arithmetic sums are depicted as nodes 1, 2, 3, 4 (stage 1). Each of these nodes, in turn, provides 2 parallel output signals, which become the inputs for the second iteration. Concurrently, the A/S units are re-configured to a +, −, +, − order, and their respective outputs are depicted in nodes 1, 5, 2, 6 (stage 2). These nodes now provide the input signals for the third iteration, with no change in the configuration of A/S units. The resultant outputs of the third iteration form half of the output vector Y, that is, the Walsh transformed elements Y1, Y3, Y5, Y7 (stage 3).

At this point, the input vector X is re-applied to the four A/S units in the same pattern as for the first iteration. The A/S units, however, are now all re-configured to the subtract function for the fourth iteration. The resultant difference outputs of the A/S units are represented by nodes 5, 6, 7, 8 (stage 4). As in iteration 1, the node signals are split and re-inputted to the A/S units, which are now re-configured in a +, −, +, − order, for iteration 5. The resultant outputs are represented by nodes 3, 7, 4, 8 (stage 5). Once again, the node signals are split and re-input to the A/S units, which retain their same configuration for iteration 6. The resultant outputs form the second set of Y vector elements (Y2, Y4, Y6, Y8), at stage 6, thus completing the transform process.

As illustrated in FIG. 2, the half-parallel array recursive algorithm provides the same resultant transform as the full-parallel form of signal flow shown in FIG. 1. To implement the inventive half-parallel algorithm, a state machine controlled half-parallel array FWT circuit is disclosed, as shown schematically in FIG. 3.

Figure 3:
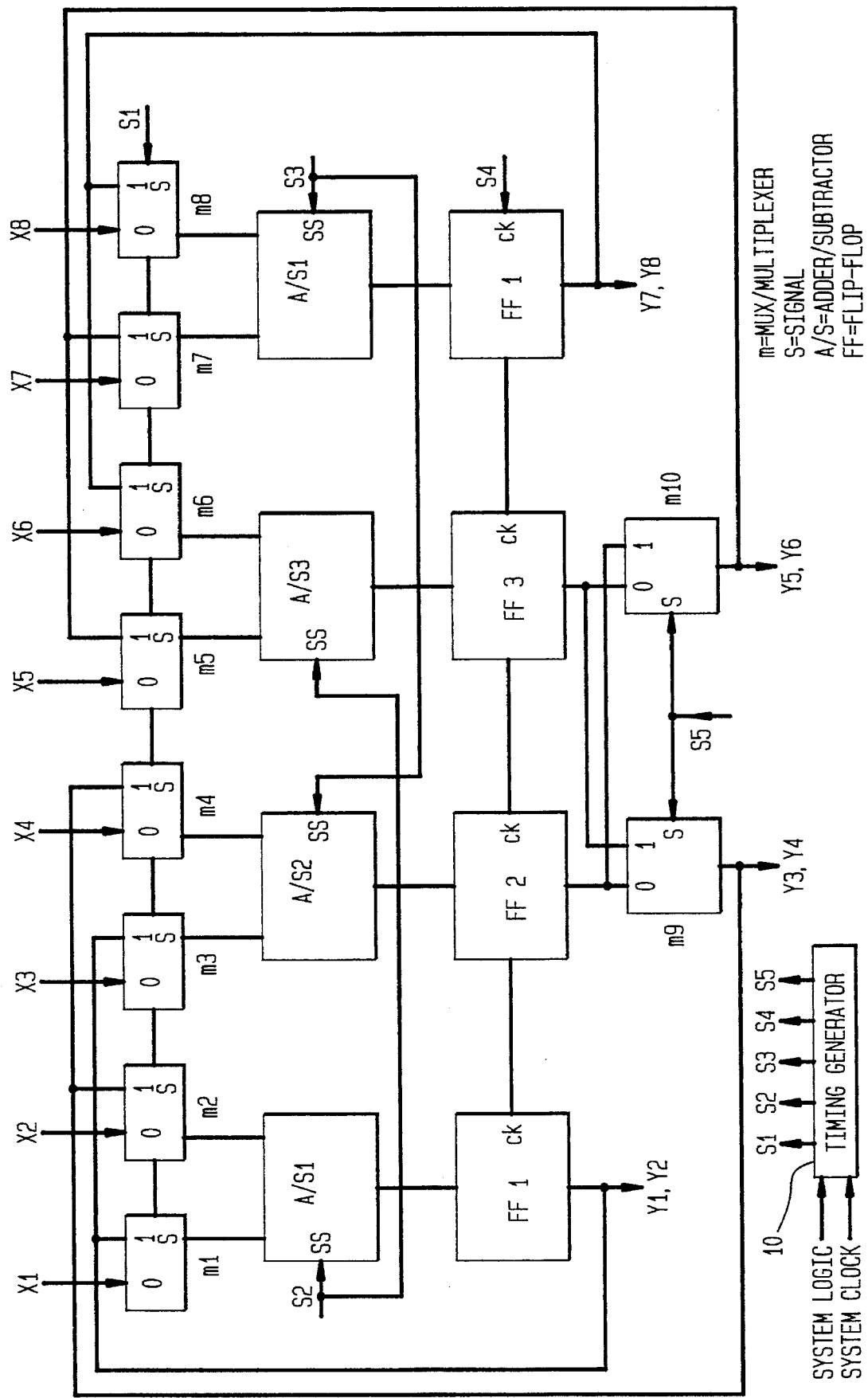
FIG. 3 schematically illustrates the inventive FWT processor circuit.

In FIG. 3, the input vector X elements (X1, X2, X3, X4, X5, X6, X7, X8) are connected to the 0 terminal inputs of multiplexers 1 thru 8, respectively. The multiplexer outputs are combined into four pairs of signal lines connected to four A/S units (A/S 1 thru A/S 4). The A/S output lines are connected to four corresponding flip-flop circuits (FF1 thru FF4). Two additional multiplexers (multiplexer 9, multiplexer 10) are used to redirect the outputs of FF2 and FF3, as required by the transform signal flow process of FIG. 1 and FIG. 2.

Again referring to FIG. 3, a Timing Signal Generator 10, in response to system logic and clock input signals, controls the 6-step iteration sequence via output signals S1, S2, S3, S4, and S5. The final FWT output vector Y elements are denoted as Y1, Y2, Y3, Y4, Y5, Y6, Y7, and Y8.

In FIG. 3, all multiplexers are controlled by their s inputs. When s=0, the multiplexer output selects the 0 terminal input. When s=1, the multiplexer output selects the 1 terminal input. The A/S units are controlled by the their ss inputs. When ss=0, the ADD function is implemented, and when ss=1, the SUBTRACT function is implemented. The initial (reset) configuration of the A/S units is ADD for A/S 1 and A/S 3, and SUBTRACT for A/S 2 and A/S 4. The flip-flops are triggered by the rising edge of their respective input signals.

Figure 4:
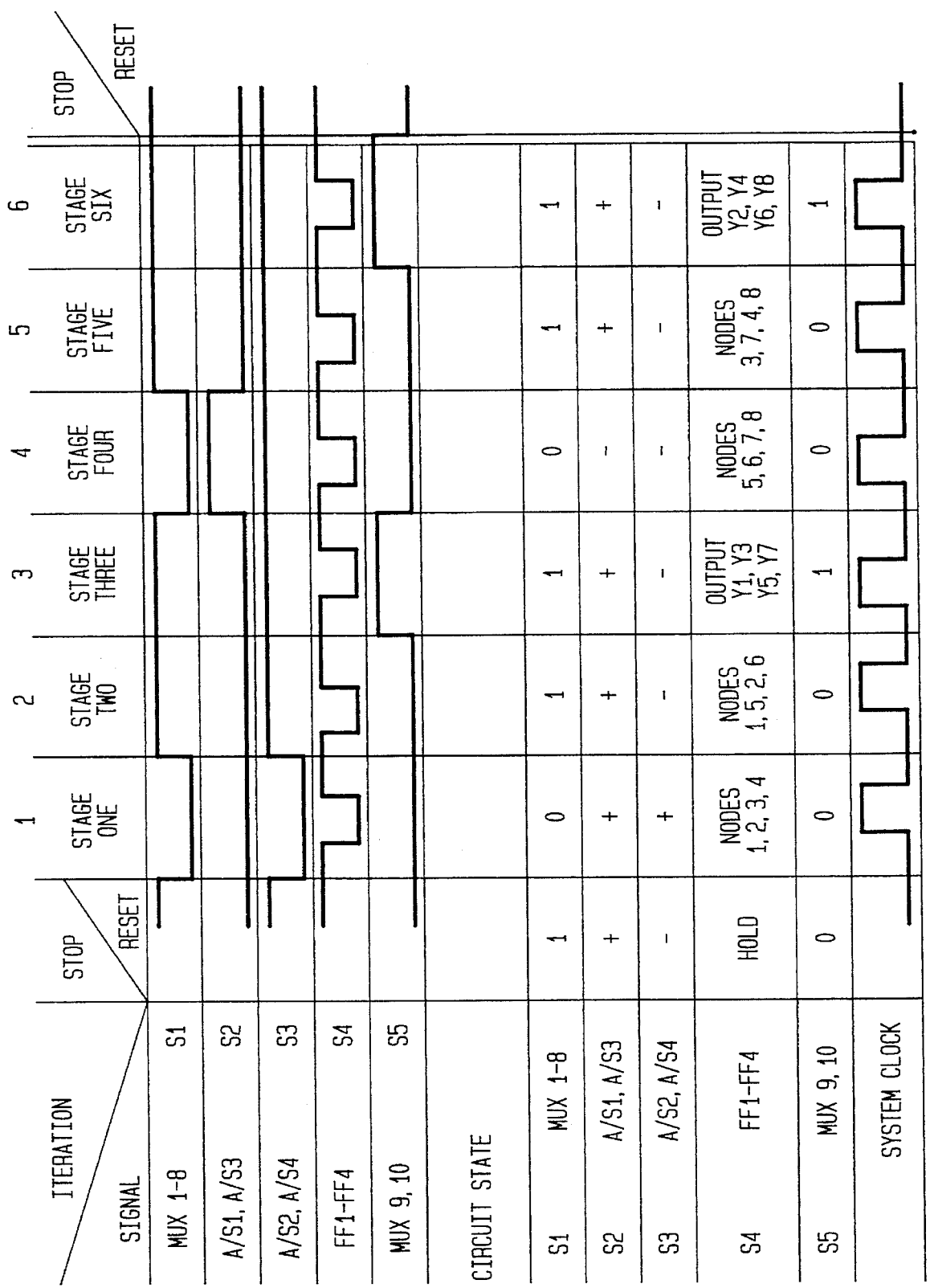
FIG. 4 illustrates the inventive FWT circuit timing diagram.

The inventive process timing diagram is illustrated in FIG. 4, and will be used to describe the operation of the inventive FWT circuit shown in FIG. 3.

Starting from the Stop/Reset position, the first iteration is activated by signals S1, S3, and S4. Signal S1 switches input multiplexers 1 thru 8 to the 0 position, which connects the Vector X elements (X1 thru X8) to their corresponding multiplexer outputs. Signal S3 selects the ADD function for A/S 2 and A/S 4, so that all 4 A/S units are in the ADD mode. Thus, the outputs of A/S 1 thru A/S 4 are <X1+X2>, <X3+X4>, <X5+X6>, and <X7+X8>, respectively. Signal S4 enables FF1 thru FF4 to store the summed outputs of their corresponding A/S units during the first iteration. These stored signals are represented by nodes 1,2,3,4 in stage 1 of FIG. 2.

Referring again to FIGS. 3 and 4, the second iteration is activated by Signals S1, S3 and S4. Signal S1 switches multiplexers 1 thru 8 back to the 1 input terminal position, which connects the flip-flop outputs to the A/S unit inputs in the following manner. FF1 output (node 1) is connected to multiplexer 1 and multiplexer 3. FF2 output (node 2) is routed through the 0 input terminal of multiplexer 9 to multiplexers 2 and 4. FF3 output (node 3) is routed through the 0 input terminal of multiplexer 10 to multiplexers 5 and 7. FF4 output (node 4) is connected to multiplexers 6 and 8. Thus, the outputs of FF1 and FF2 are each connected to the inputs of A/S 1 and A/S 2, and the outputs of FF3 and FF4 are each connected to the inputs of A/S 3 and A/S 4.

At the same time, Signal S3 selects the SUBTRACT mode for A/S 2 and A/S 4, while A/S 1 and A/S 2 remain in the ADD mode. Signal S4 then completes the second iteration by enabling FF1 thru FF4 to store the 4 corresponding A/S outputs, as nodes 1,5,2,6 in stage 2 of FIG. 2.

In the third iteration, Signal S5 switches multiplexers 9 and 10 to the 1 input terminal position, which redirects the output connections of FF2 and FF3. That is, FF2 output is connected through multiplexers 5 and 7 to A/S 3 and A/S 4, while FF3 output is connected through multiplexers 2 and 4 to A/S 1 and A/S 2. In this iteration, multiplexers 1 thru 8 remain in the 1 position, A/S 1 and A/S 3 remain in the ADD mode, A/S 2 and A/S 4 remain in the SUBTRACT mode, and FF1 and FF4 remain connected to multiplexers 1 and 3, and multiplexers 6 and 8, respectively. Thus, the flip-flop output signals (nodes 1, 5, 2, 6) are routed back to the 1 input terminals of multiplexers 1 thru 8 in the following manner. FF1 output (node 1, stage 2) is connected to multiplexer 1 and multiplexer 3. FF2 output (node 5, stage 2) is connected via multiplexer 10 to multiplexer 5 and multiplexer 7. FF3 output node 2, stage 2) is connected via multiplexer 9 to multiplexers 2 and 4. (Note: This FF2 & FF3 signal redirection is implemented in order to maintain the signal flow pattern in agreement with FIG. 1). Again in FIG. 3, FF4 output (node 6, stage 2) is connected to multiplexer 6 and multiplexer 8. The multiplexer 1 thru 8 outputs are again connected in pairs to the 4 A/S units, which are still in the +, −, +, − configuration, as shown in FIG. 2. Signal S4 completes: the third iteration by enabling FF1 thru FF4 to store their corresponding A/S outputs, as output vector Y elements Y1, Y3, Y5, Y7 (stage 3, FIG. 2).

For the fourth iteration, Signal S1 switches multiplexers 1 thru 8 to the 0 input terminal position, Signal S2 selects the SUBTRACT mode for A/S 1 and A/S 3, and Signal S5 switches multiplexers 9 and 10 back to the 0 input terminal position. As in the first iteration, inputs X1 thru X8 are again routed through multiplexers 1 thru 8, and are again connected in pairs to A/S 1 thru A/S 4, which are now in the SUBTRACT mode. Signal S4 completes the fourth iteration by enabling FF1 thru FF4 to store their respective A/S outputs, as nodes 5,6,7,8 in stage 4 of FIG. 2.

For the fifth iteration, Signal S1 switches multiplexers 1 thru 8 to the 1 input terminal position, Signal S2 selects the ADD mode for A/S 1 and A/S3, Signal S3 maintains the SUBTRACT mode for A/S 2 and A/S 4, and Signal S5 maintains the 0 input terminal position for multiplexers 9 and 10. As in the second iteration, FF1 thru FF4 outputs (nodes 5,6,7,8) are routed through multiplexers 1 thru 10, and into A/S units 1 thru 4, such that nodes 5 and 6 are paired inputs to A/S 1 and A/S 2, and nodes 7 and 8 are paired inputs to A/S 3 and A/S 4. Signal S4 completes the fifth iteration by enabling FF1 thru. FF4 to store their respective A/S outputs, as nodes 3,7,4,8 in stage 5 of FIG. 2.

For the sixth iteration, Signal S1 maintains the 1 input terminal position for multiplexeres 1 thru 8, Signal S2 maintains the ADD mode for A/S 1 and A/S 3, Signal 3 maintains the SUBTRACT mode for A/S 2 and A/S 4, and Signal S5 switches multiplexeres 9 and 10 to the 1 input terminal position. As in the third iteration, FF1 thru FF4 outputs are routed through multiplexeres 1 thru 10, and into A/S units 1 thru 4, such that nodes 3 and 4 are paired inputs to A/S 1 and A/S 2, and nodes 7 and 8 are paired inputs to A/S 3 and A/S 4. Signal S4 completes the sixth iteration by enabling FF1 thru FF4 to store their respective A/S outputs, as output vector Y elements Y2, Y4, Y6, Y8 (stage 6 of FIG. 2).

Thus the 6-step (2p) algorithm is completed, as indicated by the Stop/Reset position in FIG. 4. The speed of the disclosed FWT process is limited only by the clock period, as defined in Equation (5) below:

$$\text{Minimum clock period} = T_{ff} + T_{a/s} + 2T_{multiplexer} \quad \text{Equation (5)}$$

where $T_{ff}$ =delay time of the flip-flop $T_{a/s}$ =delay time of the adder/subtractor $T_{mux}$ =delay time of the multiplexer A minimum clock period of 60 ns is attainable through the use of 1.0 um CMOS. For 8 bits of resolution, the FWT dimension (N)=8, and p=3 (2's power of N). In this case, the total time needed for the inventive FWT process is 360 ns, equal to 2p clock cycles.

For larger values of N, the number of adder/subtractor will still be N/2, and the iteration number will still be 2p, with the total FWT time equal to 2p clock cycles.

The above described embodiment of the invention refers to a specific processor configuration which is illustrative only, but many variations of this circuit are possible. The scope of this invention, therefore, should be limited only by the following claims.

I claim:

1. A fast Walsh transform processor circuit for performing a Walsh transform on an input vector X1, X2, ... XN where N=$2^p$ and p is a positive integer, comprising:

(a) N/2 adder/substractor units; and (b) means configured to receive elements X1, X2, ... XN and configured to supply input signals to said adder/subtractor units formed from said elements X1, X2, ... XN in preselected cycles and configured to supply a control signal to each adder/subtractor unit in each of 2p successive cycles to determine whether each unit adds or subtracts in the cycle to generate an output vector Y1, Y2, ..., YN which is the Walsh transform of X1, X2, ..., XN.

2. The process circuit of claim 1 wherein said input signals in each cycle and said control signals in each cycle produce the signal flow pattern of Good's factorization of a Walsh transform.

3. The processor circuit of claim 1 wherein said input signals in the first p of said cycles and the control signals in the first p of said cycles cause said adder/subtractor units to generate the output elements Y1, Y3, ..., YN-1, and wherein said input signals in the second p of said cycles and the control signals in the second p of said cycles cause said adder/subtractor units to generate the output elements Y2, Y4, ... YN.

4. The processor circuit of claim 1, wherein the preselected cycles are the first cycle and the N/2 cycle.

5. A method for performing a fast Walsh Transform on an input vector X1, X2, ..., XN, where N=$2^p$ and p is an integer comprising the steps of:

(a) generating a signal flow of Good's factorization of a Walsh transform matrix using only N/2 adder/subtractor units by supplying an input signal which is formed from one or more of the elements X1, X2, ..., XN for each adder/subtractor unit for preselected cycles: and (b) supplying a control signal for each adder/subtractor unit which control signal determines whether the unit adds or subtracts in each of said 2p consecutive cycles to generate an output signal Y1, Y2, ..., YN which is the Walsh transform of X1, X2, ..., XN.

6. The method of claim 5 wherein said method comprises the steps of after a first p of said 2p cycles, generating the output signals Y1,Y3, ..., YN-1 from said adder/subtractor units, and after a second p of said 2p cycles generating the output signals Y2, Y4, ..., YN from said adder/subtractor units.

7. The method of claim 5, further including the step of selecting the preselected cycles to be the first and the N/2 cycles.

* * * * *